(12) United States Patent
Zhong et al.

(10) Patent No.: US 9,608,760 B2
(45) Date of Patent: Mar. 28, 2017

(54) INTEGRATED ACCESS NETWORK

(71) Applicant: Nanyang Technological University, Singapore (SG)

(72) Inventors: Wende Zhong, Singapore (SG); Quang Thai Pham, Singapore (SG)

(73) Assignee: Nanyang Technological University, Singapore (SG)

( * ) Notice: Subject to any disclaimer, the term of this patent is extended or adjusted under 35 U.S.C. 154(b) by 130 days.

(21) Appl. No.: 14/345,185

(22) PCT Filed: Sep. 20, 2012

(86) PCT No.: PCT/SG2012/000346
§ 371 (c)(1),
(2) Date: Mar. 14, 2014

(87) PCT Pub. No.: WO2013/043127
PCT Pub. Date: Mar. 28, 2013

(65) Prior Publication Data
US 2015/0010307 A1    Jan. 8, 2015

Related U.S. Application Data

(60) Provisional application No. 61/537,363, filed on Sep. 21, 2011.

(51) Int. Cl.
*H04J 14/00* (2006.01)
*H04J 14/02* (2006.01)
(Continued)

(52) U.S. Cl.
CPC .... *H04J 14/0239* (2013.01); *H04B 10/25754* (2013.01); *H04B 10/27* (2013.01);
(Continued)

(58) Field of Classification Search
CPC .. H04B 10/27; H04B 10/25753; H04B 10/67; H04J 14/0239; H04J 14/0298;
(Continued)

(56) References Cited

U.S. PATENT DOCUMENTS 7,965,947 B2 *  6/2011  Yu ................... H04B 10/2587
                                                      398/185
8,364,039 B2 *  1/2013  Yeh .................. H04B 10/2587
                                                      398/67
(Continued)

OTHER PUBLICATIONS

Cao et al., "WDM-RoF-PON Architecture for Flexible Wireless and Wire-Line Layout," *J. Opt. Commun. Netw.* 2(2):117-121, Feb. 2010.
(Continued)

*Primary Examiner* — Hanh Phan
(74) *Attorney, Agent, or Firm* — Seed IP Law Group LLP

(57) ABSTRACT

The present invention is an optical terminal device comprising a signal modulator configured to generate a first signal modulated onto a first optical sideband of a first optical wavelength signal and a second signal modulated onto a second sideband of the first optical wavelength signal, the first signal being a different type than the second signal; a receiver configured to receive a third signal modulated onto the first optical sideband of a second optical wavelength signal and a fourth signal modulated onto a second sideband of the second optical wavelength signal, the third signal being a different type than the fourth signal; and a circulator coupled to the signal modulator and the receiver, wherein the circulator is configured to communicate with a node of an integrated network via an optical fiber. A remote node, a communication terminal, and a method of performing integrated network access are also disclosed.

19 Claims, 5 Drawing Sheets

(51) Int. Cl.
H04B 10/2575 (2013.01)
H04B 10/272 (2013.01)
H04B 10/27 (2013.01)
H04B 10/67 (2013.01)

(52) U.S. Cl.
CPC ........... *H04B 10/272* (2013.01); *H04B 10/67* (2013.01); *H04J 14/025* (2013.01); *H04J 14/0246* (2013.01); *H04J 14/0282* (2013.01); *H04J 2014/0253* (2013.01)

(58) Field of Classification Search
CPC ............... H04J 14/0278; H04J 14/0245; H04J 14/0246; H04J 14/0235
USPC .. 398/66, 67, 68, 69, 70, 71, 72, 76, 79, 82, 398/115, 183, 188, 135, 136, 137, 138, 398/139, 158, 159, 100
See application file for complete search history.

(56) References Cited

U.S. PATENT DOCUMENTS

| | | | | |
|---|---|---|---|---|
| 2006/0182446 | A1* | 8/2006 | Kim | H04B 10/25752 398/72 |
| 2008/0063397 | A1* | 3/2008 | Hu | H04J 14/0282 398/43 |
| 2010/0021166 | A1* | 1/2010 | Way | H04J 14/02 398/79 |
| 2011/0262131 | A1* | 10/2011 | Gottwald | H04B 10/2503 398/41 |

OTHER PUBLICATIONS

Cho et al., "25.78-Gb/s Operation of RSOA for Next-Generation Optical Access Networks," *IEEE Photonics Technology Letters* 23(8):495-497, Apr. 15, 2011.

Chow et al., "Signal remodulation without power sacrifice for carrier distributed hybrid WDM-TDM PONs using PolSK," *Optics Communications* 282(7):1294-1297, 2009.

Kim, "Transmission of 10-Gb/s Directly Modulated RSOA Signals in Single-Fiber Loopback WDM PONs," *IEEE Photonics Technology Letters* 23(14):965-967, Jul. 15, 2011.

Jia et al., "Key Enabling Technologies for Optical-Wireless Networks: Optical Millimeter-Wave Generation, Wavelength Reuse, and Architecture," *Journal of Lightwave Technology* 25(11):3452-3471, Nov. 2007.

Jia et al., "Multiband Signal Generation and Dispersion-Tolerant Transmission Based on Photonic Frequency Tripling Technology for 60-GHz Radio-Over-Fiber Systems," *IEEE Photonics Technology Letters* 20(17):1470-1472, Sep. 1, 2008.

Kim et al., "Bidirectional WDM-RoF Transmission for Wired and Wireless Signals," *SPIE-OSA-IEEE* 7632, 2009, 12 pages.

Lim et al., "Fiber-Wireless Networks and Subsystem Technologies," *Journal of Lightwave Technology* 28(4):390-405, Feb. 15, 2010.

Olmos et al., "Reconfigurable Radio-Over-Fiber Networks: Multiple-Access Functionality Directly Over the Optical Layer," *IEEE Transactions on Microwave Theory and Techniques* 58(11):3001-3010, Nov. 2010.

Olmos et al., "Time-Slotted Full-Duplex Access Network for Baseband and 60-GHz Millimeter-Wave-Band Radio-over-Fiber," *OFC/NFOEC*, 2008, 3 pages.

Papagiannakis et al., "Design Characteristics for a Full-Duplex IM/IM Bidirectional Transmission at 10 Gb/s Using Low Bandwidth RSOA," *Journal of Lightwave Technology* 28(7):1094-1101, Apr. 1, 2010.

Pham et al., "Integration of Optically Generated Impulse Radio UWB Signals Into Baseband WDM-PON," *IEEE Photonics Technology Letters* 23(8):474-476, Apr. 15, 2011.

Tsekrekos et al., "Distribution of Millimeter-Wave and Baseband Services Over an Integrated Reconfigurable Access Network Platform," *Journal of Lightwave Technology* 28(19):2783-2790, Oct. 2010.

Won et al., "Gigabit Wireless/Wired Transmission over Full Colorless WDM-PON platform using Optical Sideband Slicing," *IQEC/CLEO Pacific Rim* 2011, Aug. 28,-Sep. 1, 2011, Sydney, Australia, 3 pages.

Wu et al., "A cost-effective WDM-PON architecture simultaneously supporting wired, wireless and optical VPN services," *Optics Communications* 284(5):1139-1145, 2011.

* cited by examiner

INTEGRATED ACCESS NETWORK

CROSS-REFERENCE TO RELATED APPLICATION

This application makes reference to and claims the benefit of priority of the applications for "Integrated Wired and Wireless Access Network Based on WDM-PON" filed on Sep. 21, 2011 with the United States Patent and Trademark Office, and there duly assigned application No. 61/537,363.

TECHNICAL FIELD

Various embodiments generally relate to the field of integrated optical access networks.

BACKGROUND

In next generation of high-speed wired and wireless networks, wavelength division multiplexed passive optical network (WDM-PON) and Radio-over-Fiber (RoF) system have been considered to be one of the most promising candidates for future wired and wireless access networks, respectively. As compared to conventional fiber to the home/premises (FTTH/P) systems, the WDM-PON provides much higher bandwidth and lower losses, latency, and jitters. The RoF system fulfils the next generation broadband wireless access network requirement of very high frequency operation, typically in the GHz ranges.

FIG. 1A show a schematic diagram illustrating a WDM-PON 100. In FIG. 1A, the downstream signal of each user is modulated with a specific wavelength at the optical line terminal (OLT) 102 located at the central office (CO). The wavelengths are then combined and sent together to the remote node (RN) 104 via a feeder fiber 106. After being de-multiplexed at the RN 104, the modulated optical signals 108 are sent to respective optical network units (ONUs) 110, where they are converted to electrical signals.

FIG. 1B shows a schematic diagram illustrating a RoF system 112. In the RoF system 112, the downstream signals follow a process similar to that of the WDM-PON 100 in that the downstream signal of each user of the RoF system 112 is modulated with a specific wavelength at the OLT 114 and that the wavelengths are then combined and sent together to the RN 116 via a feeder fiber 118. After being de-multiplexed at the RN 116, the modulated optical signals 120 are sent to respective base station (BS) 122, where they are converted to electrical signals. At each BS 122, the electrical signal is up-converted to RF band before being broadcasted.

Both the WDM-PON and the RoF schemes as shown in the WDM-PON 100 and the RoF system 112 of FIGS. 1A and 1B, respectively, share a similar concept of having signals modulated and transmitted to the receiving end by photonic means. As a result, the WDM-PON and the RoF may be integrated to deliver wired and wireless services.

It has been observed that a number of unique obstacles emerges with such an integration and simultaneously providing ultrahigh speed wired and wireless access services leads to several issues. Further, enormous initial capital and operational expenditures have hindered the wide deployment of such technology.

For example, one obstacle is to optimize the utilization of the optical spectrum for both wired and wireless signals. It has been proposed to use time-division multiplexing (TDM) in WDM-PON, polarization modulation, and a combination of both methods. However, TDM does not provide a solution for future bandwidth's requirement and polarization modulation/control proves to be complicated.

It has also been suggested that baseband wired signal and RF wireless signal may be modulated into the same optical carrier, and then low-speed and high-speed photo detectors may be used to separate the data at a receiver. However, such a method significantly increases the system cost.

Using optical carrier re-modulation may have been shown to be a more cost-effective method by utilizing the optical wavelength. However, more than often the system's performance is severely limited by crosstalk.

For RoF systems, the RF wireless data is conventionally sent downstream using the subcarriers and the optical carrier is for upstream re-modulated data. However, for an integrated system, using the subcarriers for wireless data is not possible. Moreover, for wireless signal at RF, the modulated optical signals required expensive and high loss optical devices for modulation and detection. For high speed wireless systems, complex modulation method such as orthogonal frequency division multiplexing (OFDM) is referred.

RoF systems for wireless access or WDM-PONs for wired access have been or are currently being investigated. Although integration of wired and wireless access over a single WDM-PON reveals potentials in providing network access improvements, such an integrated system also leads to a number of issues. A system dealing with at least all of the above-mentioned obstacles and issues have yet to be reported.

Thus, there is a need to provide an integrated access network that would have a simple structure, provide high (large) bandwidths and is cost effective; thereby seeking to address at least the above-mentioned problems.

SUMMARY

In various embodiments, an optical terminal device is provided, including a signal modulator configured to generate a first signal modulated onto a first optical sideband of a first optical wavelength signal and a second signal modulated onto a second sideband of the first optical wavelength signal, the first signal being a different type than the second signal; a receiver configured to receive a third signal modulated onto the first optical sideband of a second optical wavelength signal and a fourth signal modulated onto a second sideband of the second optical wavelength signal, the third signal being a different type than the fourth signal; and a circulator coupled to the signal modulator and the receiver, wherein the circulator is configured to communicate with a node of an integrated network via an optical fiber.

According to various embodiments, a remote node is provided including a relay unit configured to relay a first signal modulated onto a first optical sideband of a first optical wavelength signal and a second signal modulated onto a first optical sideband of the second optical wavelength signal between an optical terminal device and a first communication terminal of an integrated network; and a third signal modulated onto a second optical sideband of the first optical wavelength signal and a fourth signal modulated onto a second sideband of the second optical wavelength signal between the optical terminal device and a second communication terminal of the integrated network, wherein the first signal and the second signal are of different types than the third signal and the fourth signal.

In various embodiment, a communication terminal is provided including a first interface configured to optically communicate with a remote node of an integrated network; a second interface configured to electrically communicate with a communication device; and a converter arranged between the first and the second interfaces, the converter configured to convert a signal between an optical form and an electrical form, wherein the signal being converted from the optical form to the electrical form is received from the first interface and includes a first signal modulated onto a first optical sideband of a first optical wavelength signal; and wherein the signal being converted from the electrical form to the optical form is output to the first interface and comprises a second signal modulated onto the first optical sideband of a second optical wavelength signal, the first signal being a same type as the second signal.

In various embodiments, a method of performing integrated network access is provided, the method including generating a first signal modulated onto a first optical sideband of a first optical wavelength signal and a second signal modulated onto a second sideband of the first optical wavelength signal, wherein the first signal is of a different type than the second signal; receiving a third signal modulated onto the first optical sideband of a second optical wavelength signal and a fourth signal modulated onto a second sideband of the second optical wavelength signal, wherein the third signal is of a different type than the fourth signal; and communicating the generated signals and the received signals with a node of an integrated network via an optical fiber.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. The dimensions of the various features/elements may be arbitrarily expanded or reduced for clarity. In the following description, various embodiments of the invention are described with reference to the following drawings, in which.

DETAILED DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

In order that the invention may be readily understood and put into practical effect, particular embodiments will now be described by way of examples and not limitations, and with reference to the figures.

Figure 1A:
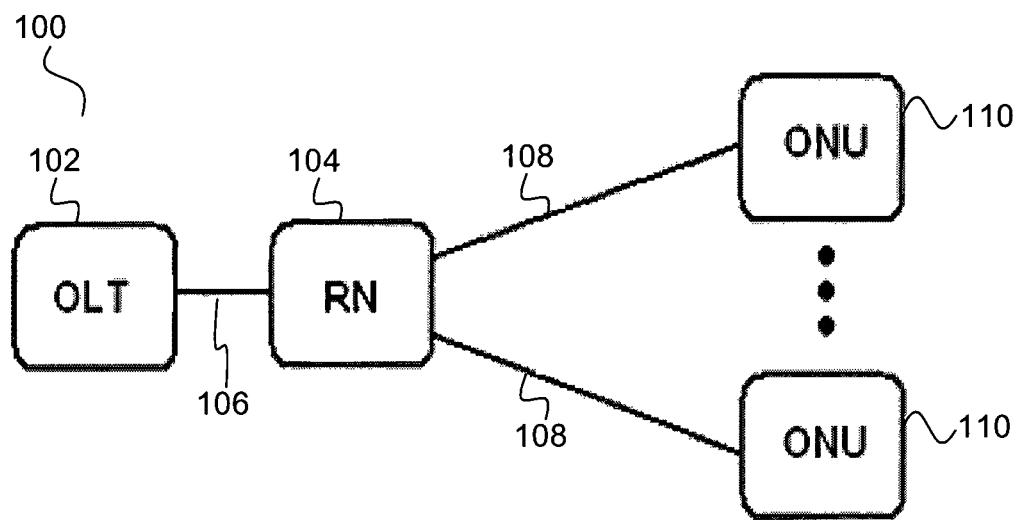
FIG. 1A shows a schematic diagram of an exemplary WDM-PON.
Figure 1B:
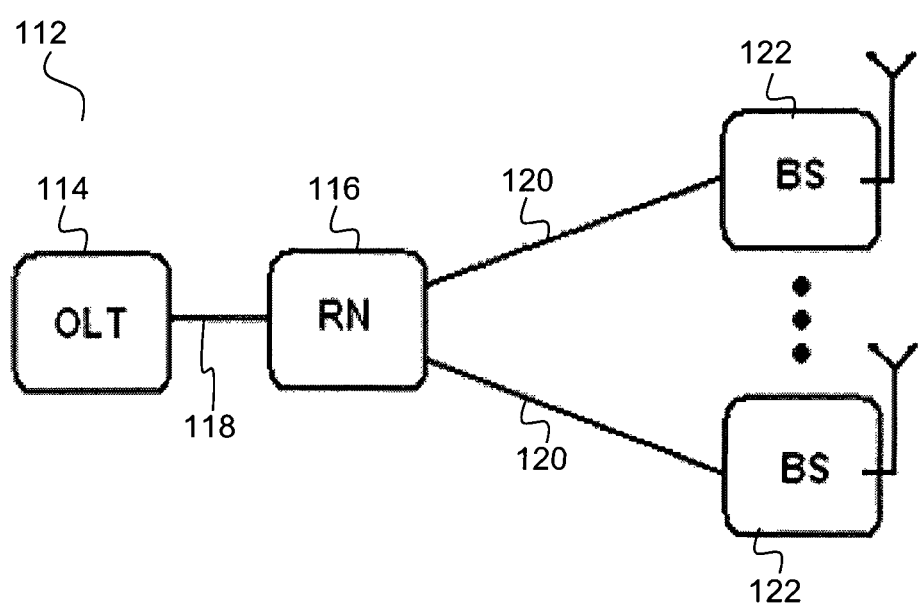
FIG. 1B shows a schematic diagram of an exemplary RoF system.

It has been realized by the inventors, the WDM-PON 100 of FIG. 1A and the RoF system 112 of FIG. 1B reveal that the large bandwidth of each optical channel (i.e., the respective feeder fibers 106, 118) is not fully utilized in both cases. In order to ultimately provide integration of ultrahigh speed wired and wireless services, the similarity in the architecture of both systems can be analyzed and the large bandwidth of optical devices may be exploited.

Figure 2:
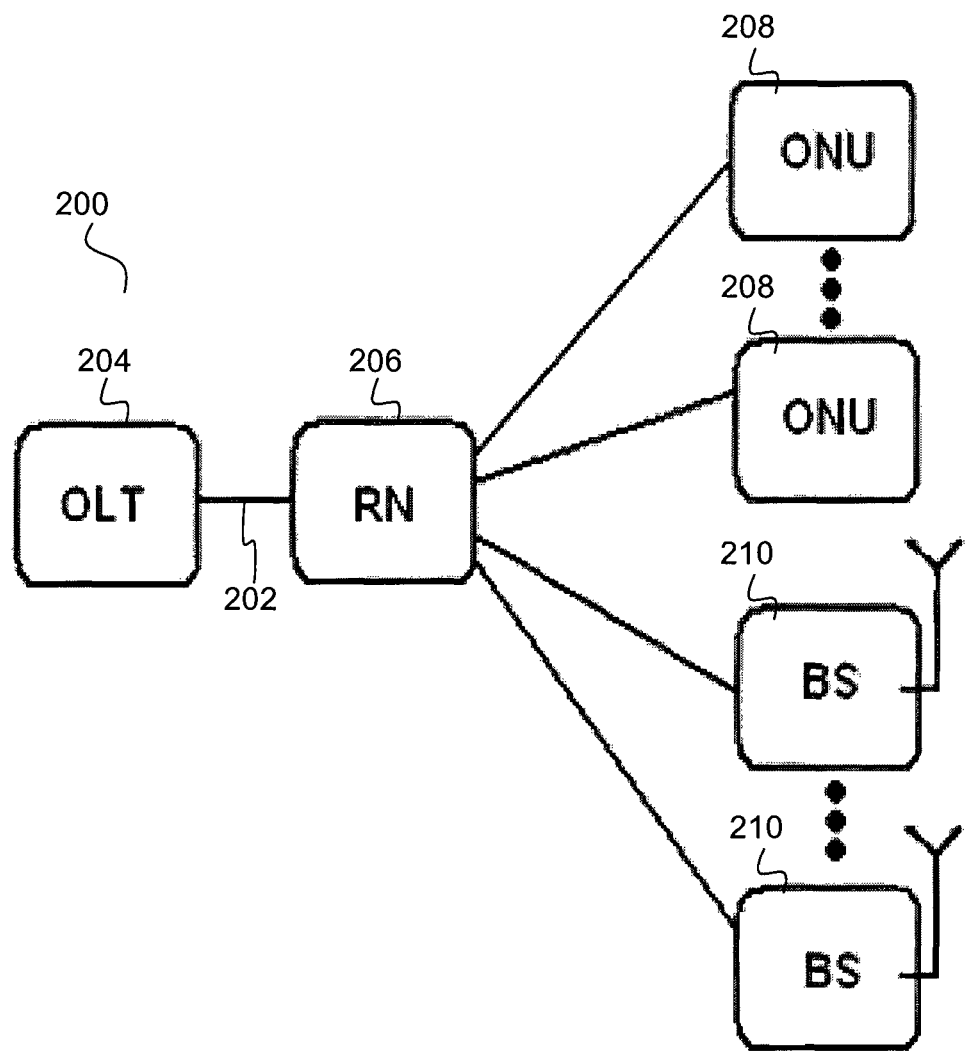
FIG. 2 shows a schematic diagram of an integrated network, in accordance to various embodiments.

FIG. 2 shows an integrated system 200 with data for both services are being transmitted in one optical feeder fiber 202, in accordance with various embodiments. In FIG. 2, the downstream signal of each user is modulated with a specific wavelength at the OLT 204. The wavelengths are then combined and sent together to the RN 206 via the optical feeder fiber or interchangably referred to as the optical channel or feeder channel 202. After being de-multiplexed at the RN 206, the modulated signals are sent to respective ONUs 208 and/or BS 210, where they are respectively converted to electrical signals. For each of the BS 210, the electrica signal is up-converted to RF band before being broadcasted.

For example, the OLT 204 may be the OLT 102, 112; the optical channel 202 may be the feeder channel 106, 118; the RN 206 may be the RN 104, 116; the ONUs 208 may be the ONUs 110; and the BS 210 may be the BS 122 of FIG. 1A or 1B.

Various embodiments provide an integrated wired and wireless access network based on WDM-PON. Such an integrated access network is cost effective as centralized light-source and optical signal re-modulation methods may be utilized to reduce hardware requirements. Further, only baseband signals may be used to subdue dispersion distortion while enabling low cost and commercially off-the-shelf optical devices to be employed. This may allow the minimalistic architecture to be achieved and developed with practical and profitable applications awareness. Signal processing techniques employed may be direct but effective, and significantly increase the receiver's sensitivity and lessen the power budget requirement.

Various embodiments provide an integrated ultra-high speed wired and wireless access network with cost-effective OLT, RN, ONU, and BS structures (e.g., the OLT 204, the RN 206, the ONU 208, and the BS 210 of FIG. 2, respectively) to achieve at least the operations of both WDM-PON and RoF systems (e.g., the WDM-PON 100 of FIG. 1A and the RoF system 114 of FIG. 1B). Both wired and wireless access may also be performed simultaneously. For example, reflective semi-conductor optical amplifiers (RSOAs) may be utilized at the OLT, ONU and BS. The RSOAs may be used to modulate downlink data and re-modulate uplink data for both wired and wireless services. Signal processing techniques that are direct but effective are used to mitigate the crosstalk from downstream signals to upstream signals, and therefore further improve a receiver's sensitivity. For downstream signals, the receiver may refer to any, ONU or BS, and for upstream signals, the receiver may refer to the OLT. Downstream and upstream signals of both wired and wireless services may be kept at baseband. Current optoelectronic technologies allow for acceptably good performance for modulation and photo detection at baseband. This further enables a number of low-cost off-the-shelf products to be used.

Various embodiments may be commercialized without major modification since most of the devices used are available in the market and no special equipment would be necessary for manufacturing; thereby allowing the manufacturing process to be compatible with existing conventional technologies. Packaging and commercializing would also not be an issue since the number of hardware requirements is small and most of the required components are low-cost optical devices. This may allow cost-effective large scale production. Each module may be optimized with respect to the whole architecture. For example, the OLT, RN, BS, ONU along with various respective components such as the RSOAs may be optimized to achieve the most minimalistic possible design for even faster transmission data rate; thereby providing improved high speed wired and wireless services with further significantly reduced cost.

Various embodiments also provide a method which is expected to substantially reduce the implementation cost of future integrated ultra-high speed wired and wireless access network and would be of significant impacts to both academic research and commercial applications. For example, telecommunication carriers and equipment manufacturers would be able to vastly enhance the capability of their access networks using the systems and techniques in accordance with various embodiments. Conventional optical wireless access systems more than often suffer from high costs due to the expensive RF components and optoelectronic devices, therefore various embodiments would provide a strong foundation for future developments of RoF systems and WDM-PON in terms of practicality, performance and cost and accelerate the deployment of ultrahigh speed optical wireless access systems, more specifically, the next generation integrated ultrahigh speed wired and wireless access networks.

Various embodiments provide an integrated access network that may be easily commercialized and more practicable for manufacturing, and would therefore be of great interest to both local and international companies such as Singapore Telecom (SingTel), Star Hub, Singapore Technologies (ST), Huawei Technology, Alcatel-Lucent, NTT, Ericsson, China Telecom, etc. Additionally, transmitting both wired and wireless data over a WDM-PON would prove to be particularly useful for companies such as Singapore Telecom (SingTel), Singapore Technologies (ST) Electronics and StarHub to develop their future ultrahigh speed integrated wired and wireless access network platform.

Figure 3:
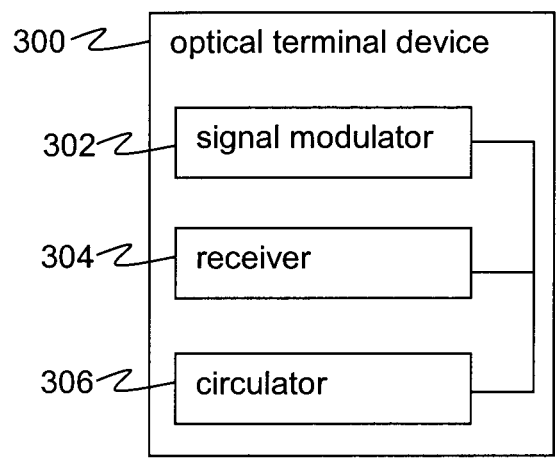
FIG. 3 shows a block diagram of an optical terminal device, in accordance to various embodiments.

In a first aspect, an optical terminal device 300 is provided as shown in FIG. 3. In FIG. 3, the optical terminal device 300 includes a signal modulator 302 configured to generate a first signal modulated onto a first optical sideband of a first optical wavelength signal and a second signal modulated onto a second sideband of the first optical wavelength signal, the first signal being a different type than the second signal; a receiver 304 configured to receive a third signal modulated onto the first optical sideband of a second optical wavelength signal and a fourth signal modulated onto a second sideband of the second optical wavelength signal, the third signal being a different type than the fourth signal; and a circulator 306 coupled to the signal modulator 302 and the receiver 304, wherein the circulator 306 is configured to communicate with a node of an integrated network via an optical fiber.

In the context of various embodiments, the term "optical terminal device" generally refers to a device which serves as an endpoint of an optical network.

In various embodiments, the optical terminal device 300 may include an optical line terminal of the integrated network having a wavelength division multiplexed passive optical network (WDM-PON) structure and a radio over fiber (RoF) network structure.

As used herein, the term "optical line terminal" (OLT) may interchangably be referred to as an optical line termination which serves as the service provider endpoint of a passive optical network. The OLT may perform conversion between the electrical signals used by the service provider's equipment and the fiber optic signals used by the passive optical network and may coordinate the multiplexing between the conversion devices on the other end of that network (which is referred to as either optical network terminals or optical network units).

For example, the optical terminal device 300 may be the OLT 204 of FIG. 2. The integrated network described herein may refer to the integrated network 200, and the single optical fiber may be the optical channel 202 of FIG. 2.

In the context of various embodiments, a "circulator" refers to an optical circulator, which is a special fiber-optic component that can be used to separate optical signals that travel in opposite directions in an optical fiber. For example, the optical circulator is generally a three-port device which allows light to enter any port and exit from the next.

The term "node" generally refers to any point in a network. For example, a node may be but is not limited to a device terminal, or an intermediate device, or a server provider, or an endpoint, or an access point.

In the context of various embodiments, the term "generate" may refer but is not limited to "derive", "create", or "obtain". The term "communicate" means to have an exchange of signals by transmitting and/or receiving the signals to and from various nodes.

As used herein, the term "modulated" refers to being subject to modulation. In telecommunications, modulation is the process of conveying a message signal, for example a digital bit stream or an analog audio signal, inside another signal that can be physically transmitted. In other words, modulation transforms one signal into another signal such that the other signal can be transmitted. For example, the one signal may be seen to be riding on the other signal, which is often referred to as the carrier signal. The carrier signal may be an "optical wavelength signal". Generally, modulation results in shifting the signal up to much higher frequencies (e.g. radio frequencies, or RF) than it originally spanned.

As used herein, the term "type" is made with reference to the signal based on its physical properties or the mode in which the signal is communicated. For example, the type may refer to but is not limited to the type of network access such as wired access or wireless access; or the type of communication such as unicast or multicast; or the type of access speed such as high speed datalink or low speed datalink; or any pair or group of signals with complementary properties.

In various embodiments, each of the first signal and the third signal may include a wired signal; and each of the second signal and the fourth signal may include a wireless signal. The types of the first, second, third and fourth signals are based on their respective access type.

Wired signals may generally be transmitted via an electrical cable and wireless signals may generally be transmitted using radio frequencies.

In various embodiments, the optical terminal device 300 may further include a light source configured to generate a plurality of optical wavelength signals, wherein the plurality of optical wavelength signals comprises the first optical wavelength signal and the second optical wavelength signal.

In some embodiments, the first optical wavelength signal or a part thereof may be the same as the second optical wavelength signal or a part thereof. For example, the first optical wavelength signal may be re-used as the second optical wavelength signal. In another example, a part of the first optical wavelength signal may be re-used as the second optical wavelength signal. The "re-use" of optical wavelength signal may be carried out by re-modulation as described below.

The light source may include a multiple wavelength light source, i.e., a light source which produce signals with different optical wavelengths.

Generally, the optical wavelength signal may be modulated to obtain an optical carrier and optical sidebands. An "optical sideband" or interchangably referred to as an optical subcarrier is a band of frequencies higher than or lower than the carrier frequency (i.e., referred to as upper sideband and lower sideband, respectively), containing power as a result of a modulation process on an optical wavelength signal. Mathematically, the sidebands may be represented by all the Fourier components of the modulated signal except the carrier.

In various embodiments, the optical terminal device 300 may further incude an electro-optical modulator arranged between the light source and the signal modulator 302, wherein the electro-optical modulator is configured to suppress a carrier of the first optical wavelength signal. For example, the electro-optical modulator may be configured to perform modulation on the first optical wavelength signal based on a predetermined ratio frequency ($f_{LO1}$) to generate the first optical sideband and the second optical sideband of the first optical wavelength signal.

As used herein, the term "ratio frequency" may refer to an intermediate frequency.

The first optical sideband and the second optical sideband may be spaced apart from each other by $2f_{LO1}$. Optical sidebands may be spaced apart from each other by two times the predetermined ratio frequency.

In various embodiments, the first optical sideband may be an upper optical sideband. The second optical sideband may be a lower optical sideband.

In various embodiments, only one multiwavelength laser source (MLS) laser may be used at the OLT (for example, the OLT 204 of FIG. 2 or the optical terminal device 300 of FIG. 3) and no other laser sources may be required in each ONU (for example, the ONU 208 of FIG. 2) and each BS (for example, the BS 210 of FIG. 2). Since each wavelength of the MLS laser may support both downstream and upstream data for both wired and wireless services, the number of required wavelengths is effectively reduced to ¼. Also, the spectrum may be efficiently utilized.

In contrast, if an array of laser sources is used, precisely managing and controlling each of the specific wavelengths in an OLT are not only complicated but can also be comparatively costly.

In various embodiments, the optical terminal device 300 may further include a wired-wireless receiver configured to receive a downstream wired signal as the first signal and a downstream wireless signal as the second signal, wherein the wired-wireless receiver is connected to the signal modulator. For example, the wired-wireless receiver may be a wired/wireless switch.

The signal modulator may be configured to modulate the first signal onto the first optical sideband of the first optical wavelength signal or the second signal onto the second optical sideband of the first optical wavelength signal using baseband modulation.

As used herein, the term "baseband modulation" refers to a fundamental technique for communication systems. The term "baseband" is the actual frequency band of signal, for example, the actual wired signal (or data) or the actual wireless signal (or data) from/to a core router, a stream server or a plain old telephone service. Baseband signals may be composed of a single frequency or group of frequencies or in the digital domain composed of a data stream sent over an unmultiplexed channel. It should be appreciated that different type of signals have different baseband. As an illustrative example, if the actual signal is a voice signal, voice signal band is about 4 kHz, which means the voice signal contains frequencies ranging from 0-4 kHz, that being the baseband signal. Other examples of different baseband signals may be but are not limited to video signals (from a TV camera) which contain frequencies generally ranging from 0 Hz-5.5 MHz, 2G/2.5G/3G wireless baseband signals, or digital (or pulse train) signals such as Ethernet signals operating over a Local Area Network (LAN).

By modulation as defined above, the signal frequency is increased in some way. Taking the earlier illustrative example, this means the voice base band of 4 kHz may be increased to the voice signal frequency of, for example, 1900 kHz. Uplifting or increasing the frequency of actual baseband signal is referred to as baseband modulation. Baseband modulation may be used for both analog signals and digital signals.

In one embodiment, the baseband modulation may be on-off keying (OOK) intensity modulation, which is a form of amplitude-shift keying (ASK) modulation. It should be appreciated that baseband modulation or more specifically digital baseband modulation may also be but is not limited to continuous phase modulation (CPM), frequency-shift keying FSK, multiple frequency-shift keying (MFSK), phase-shift keying (PSK), or quadrature amplitude modulation (QAM).

In various embodiments, the signal modulator may be a reflective semi-conductor optical amplifier (RSOA). A RSOA is generally an amplifier which uses a semiconductor to provide the gain medium. The RSOA is used in a passive optical network (PON) for compensating for light loss in an optical link. Using the RSOA in a signal modulator module increases economical efficiency and practical use of a bandwidth. The RSOA has a broad optical spectrum and provides a cost-effective way to reuse optical wavelength. The RSOA may also amplify optical signal to increase the receiver's sensitivity. However, the RSOA has relatively small modulation bandwidth. To exploit the use of the RSOAs in various embodiments of the present invention, baseband modulation may be used.

In various embodiments, the optical terminal device 300 may include a photo detector configured to detect an upstream wired signal as the third signal and an upstream wireless signal as the fourth signal, wherein the photo detector is connected to the receiver. In these embodiments, the second optical wavelength signal may include at least a part of at least one of the plurality of optical wavelength signals from the light source. In one embodiment, the second optical wavelength signal may include the first optical wavelength signal or a part thereof. In such a case, the second optical wavelength signal may be referred to as re-using the first optical wavelength signal or a part thereof, or as remodulating using the first optical wavelength signal or a part thereof. For example, at least a part of at least one of the plurality of optical wavelength signals may refer to an optical wavelength signal obtained by first determining downstream wired signal (or data) with a larger portion (say for example about 80%) of the detected signal being injected into a RSOA for re-modulation of upstream data.

In various embodiments, the signal modulator 302 may include a plurality of signal modulators; and the photo detector may include a plurality of photo detectors.

The optical terminal device 300 may further include a first pair of arrayed waveguide gratings (AWGs) coupled to the plurality of signal modulators, each of the first pair of AWGs configured to multiplex the modulated downstream wired signals and the modulated downstream wireless signals; and a second pair of AWGs coupled to the plurality of photo detectors, each of the second pair of AWGs configured to de-multiplex the upstream wired signals and the upstream wireless signals.

As used herein, the term "multiplex" may be interchangably referred to as "join" or "append". The term "de-multiplex" has the opposite function to "multiplex" and may be interchangably referred to as "split" or "divide".

In various embodiments, the optical terminal device 300 may further include an interleaver coupled to the signal modulator, wherein the interleaver is configured to combine the downstream signals, i.e., the downstream wired signals and the downstream wireless signals. The optical terminal device 300 may further include a de-interleaver coupled to the receiver, wherein the de-interleaver is configured to separate the upstream signals, i.e., the upstream wired signals and the upstream wireless signals.

As used herein, the term "combine" with reference to interleaving refers to arranging data in a non-contiguous way to increase performance.

It should also be appreciated that the interleaver and the de-interleaver are an optical interleaver and an optical de-interleaver, respectively. The de-interleaver operates the opposite (or reverse) function of the interleaver. In some examples, the de-interleaver may also be referred to as an interleaver but it should be understood that such an interleaver may be configured to separate the upstream signals, i.e., the upstream wired signals and the upstream wireless signals.

Figure 4:
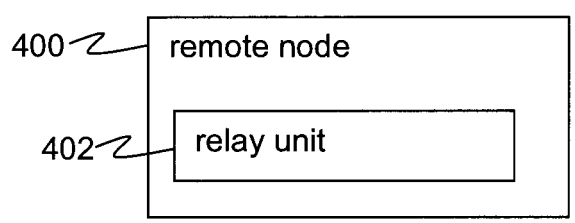
FIG. 4 shows a block diagram of a remote node, in accordance to various embodiments.

In a second aspect, a remote node 400 is provided as shown in FIG. 4. In FIG. 4, the remote node 400 includes a relay unit 402 configured to relay a first signal modulated onto a first optical sideband of a first optical wavelength signal and a second signal modulated onto a first optical sideband of the second optical wavelength signal between an optical terminal device and a first communication terminal of an integrated network; and a third signal modulated onto a second optical sideband of the first optical wavelength signal and a fourth signal modulated onto a second sideband of the second optical wavelength signal between the optical terminal device and a second communication terminal of the integrated network, wherein the first signal and the second signal are of different types than the third signal and the fourth signal.

For example, the remote node 400 may be the RN 206 of FIG. 2. The optical terminal device may be the optical terminal device 300 of FIG. 3 or the OLT 204 of FIG. 2. The integrated network may be the integrated network 200 of FIG. 2 and the single optical fiber may be the optical channel 202 of FIG. 2. The communication terminal may refer to the ONU 208 and/or the BS 210 of FIG. 2, or the communication terminal 500 (FIG. 5) as described below.

In various embodiments, the remote node 400 may further include a first transceiver configured to receive and transmit a downstream wired signal as the first signal and an upstream wired signal as the second signal; and a second transceiver configured to receive and transmit a downstream wireless signal as the third signal and an upstream wireless signal as the fourth signal, wherein the first transceiver and the second transceiver are optically coupled to the relay unit 402.

In the context of various embodiments, the term "transceiver" refers to providing both transmitting and receiving capabilities and functions. For example, a transceiver may be a part of the interleaver or a part of the AWG. The transceiver may act as an input/output port, or may be a virtual feature in the remote node that provides both transmitting and receiving capabilities and functions. As used herein, the term "optically coupled" refers to the transmitting and receiving of signals optically within the remote node. It should be appreciated that "optically coupled" in this context need not refer to a physical connection.

The terms "interleaver", "communicate", "AWG", "modulated", "optical sideband", "optical wavelength signal", and "type" may be as defined above.

In various embodiments, the remote node 400 may further include an interleaver configured to communicate with the optical terminal device of the integrated network via an optical fiber.

The remote node 400 may further include a set of arrayed waveguide gratings (AWGs) arranged between the interleaver of the remote node and a plurality of communication terminals of the integrated network, the plurality of communication terminals comprising the first communication terminal and the second communication terminal.

For the plurality of communication terminals, each of the set of arrayed waveguide gratings (AWGs) may be configured to multiplex the respective upstream signals and to de-multiplex the respective downstream signals. This means that a first AWG in the set of AWGs may be configured to multiplex the upstream wired signals while a second AWG in the set of AWGs may be configured to multiplex the upstream wireless signals. Likewise, the first AWG in the set of AWGs may also be configured to de-multiplex the downstream wired signals while the second AWG in the set of AWGs may also be configured to de-multiplex the downstream wireless signals. The upstream wired signals and the upstream wireless signals may be transmitted from the plurality of communication terminals. The downstream wired signals and the downstream wireless signals may be transmitted from the plurality of signal modulators of the integrated network.

For the plurality of communication terminals, the interleaver may be configured to combine the upstream wired signals and the upstream wireless signals, or to separate the downstream wired signals and the downstream wireless signals. For example, the interleaver may be a delay interferometer.

The terms "multiplex", "de-multiplex", "combine" and "separate" may be as defined above.

Figure 5:
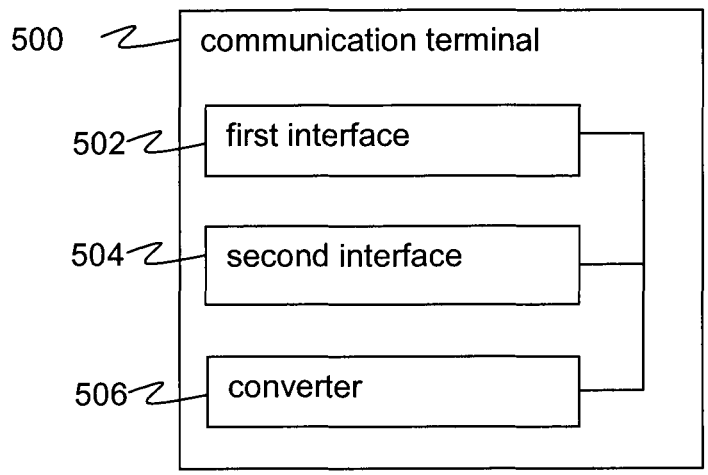
FIG. 5 shows a block diagram of a communication terminal, in accordance to various embodiments.

In a third aspect, a communication terminal 500 is provided as shown in FIG. 5. In FIG. 5, the communication terminal 500 includes a first interface 502 configured to optically communicate with a remote node of an integrated network; a second interface 504 configured to electrically communicate with a communication device; and a converter 506 arranged between the first and the second interfaces 502, 504, the converter 506 configured to convert a signal between an optical form and an electrical form, wherein the signal being converted from the optical form to the electrical form is received from the first interface 502 and includes a first signal modulated onto a first optical sideband of a first optical wavelength signal; and wherein the signal being converted from the electrical form to the optical form is output to the first interface 502 and includes a second signal modulated onto the first optical sideband of a second optical wavelength signal, the first signal being a same type as the second signal.

As used herein, the term "communication terminal" may refer to a machine that assists data transmission, that is sending and/or receiving data information. Accordingly, the communication terminal may also be generally referred to as a node. For example, the communication terminal may be a communication terminal of the plurality of communication terminals. A communication terminal may be, for example but not limited to, a station, or a mobile station (MS), or a substation, or a port, or a base station, or an ONU.

In one embodiment, the communication terminal 500 may include an optical network unit (ONU) configured to receive and transmit respective wired signals. The term "ONU" may also be interchangably refer to an optical network termination (ONT).

In another embodiment, the communication terminal 500 may be a base station configured to receive and transmit respective wireless signals. The base station may be further configured to convert the respective wireless signals to respective wireless radio frequency signals for transmission via an antenna, and to convert respective wireless radio frequency signals received by the antenna to the respective wireless signals.

For example, the communication terminal 500 may be the ONU 208 or the BS 210 of FIG. 2. The ONUs 208 and BSs 210 are wavelength independent, as such colorless operation for both wired and wireless services can be achieved. This is provided for practical deployment of the integrated wired and wireless access network in accordance with various embodiments.

The remote node may refer to the remote node 400 of FIG. 4 or the RN 206 of FIG. 2. The integrated network may be the integrated network 200 of FIG. 2.

In an example, the first interface 502 may be a coupler configured to divide an optical signal into two or more optical paths. The coupler may divide the optical signal evenly or at different ratios or percentage power. For example, the first interface 502 may be but is not limited to a 20:80 coupler, or a 30:70 coupler, or a 40:60 coupler, or a 50:50 coupler.

In an example, the second interface 504 may be but is not limited to a wired cable or connection, an analogue device, a buffer, an amplifier, a duplexer, or an antenna.

The term "optically" refers to transmission in an optical form, i.e., via a light signal (e.g., an optical wavelength signal); and the term "electrically" refers to transmission in an electrical form via an electrical signal or electromagetic signal. A DC signal, an AC signal, or a RF signal are examples of an electrical/electromagnetic signal.

As used herein, the term "converter" refers to a transducer which changes one form of energy to another. The term "convert" means "transform", "change" or "translate".

The terms "communicate", "modulated", "optical sideband", "optical wavelength signal", and "type" may be as defined above.

The term "same type" is as oppose to "different type" as defined above.

In various embodiments, the communication terminal 500 may further include a coupler transceiver configured to receive a downstream signal as the first signal, and to transmit an upstream signal as the second signal. The downstream signal may be a downstream wired signal or a downstream wireless signal. The upstream signal may be an upstream wired signal or an upstream wireless signal.

In various embodiments, the converter 506 may include a reflective semi-conductor optical amplifier (RSOA) configured to perform a re-modulation of the upstream signals. The RSOA may be further configured to receive a part of the downstream signals to perform the re-modulation. The converter 506 may further comprise a photo detector configured to detect the downstream signals.

In the context of various embodiments, the term "re-modulation" refers to modulation involving a signal or a part thereof that has been modulated. For example, in the communication terminal 500, the upstream data received from a communication device (e.g. a mobile phone, not shown in the figures) is modulated to a data modulated downstream signal received from an optical terminal device (e.g. the optical terminal device 300 of FIG. 3) via the remote node 400 (FIG. 4). Re-modulation may present a form of re-using an optical wavelength signal for downstream transmission and subsequently for upstream transmission. By re-modulation, a separate light source is not required. This advantageously reduces the cost of the communication device substantially since each communication device need not be equipped with a laser source of specific wavelength.

As used herein, the term "communication device" refers to a machine that assists data transmission, that is sending and/or receiving data information. A communication device may be but is not limited to, for example, a station, or a mobile station (MS), or a port, or a personal basic service set central point, or a mobile phone, or a cellular phone, etc.

Figure 6:
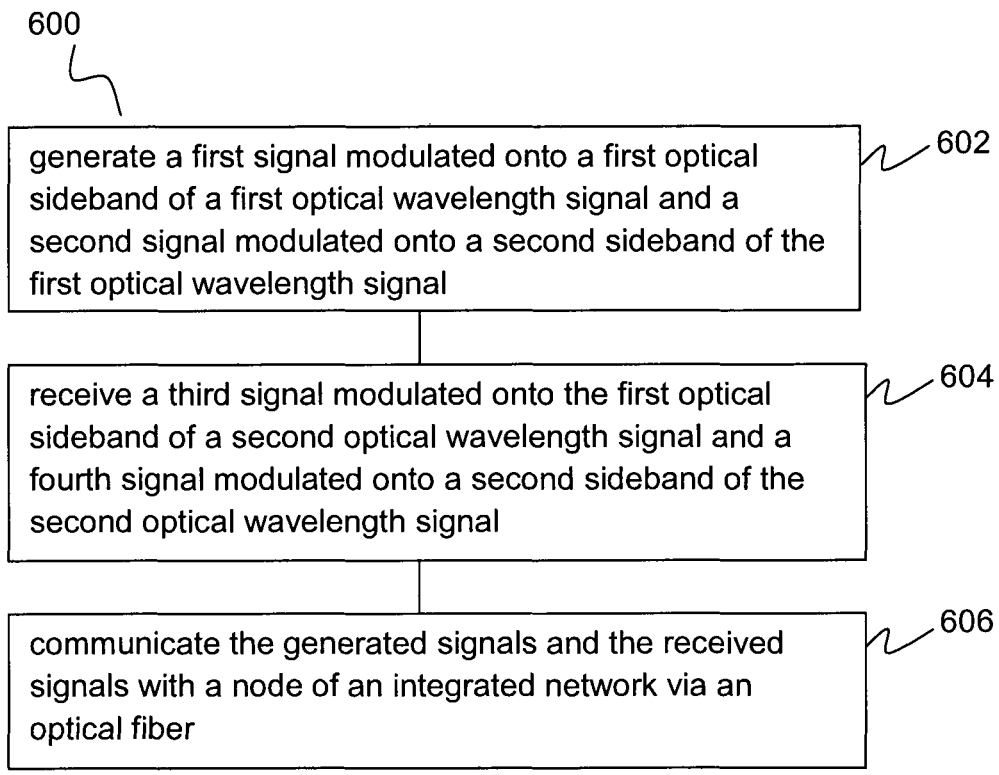
FIG. 6 shows a flow diagram of a method of performing integrated network access, in accordance to various embodiments.

In a fourth aspect, a method of performing integrated network access 600 is provided as shown in FIG. 6. In FIG. 6, at 602, a first signal modulated onto a first optical sideband of a first optical wavelength signal and a second signal modulated onto a second sideband of the first optical wavelength signal are generated, wherein the first signal is of a different type than the second signal. At 604, a third signal modulated onto the first optical sideband of a second optical wavelength signal and a fourth signal modulated onto a second sideband of the second optical wavelength signal are received, wherein the third signal is of a different type than the fourth signal. At 606, the generated signals and the received signals are communicated with a node of an integrated network via an optical fiber.

The terms "generate", "communicate", "modulated", "optical sideband" (more specifically, the first optical sideband and the second optical sideband), "optical wavelength signal", and "type" may be as defined above.

In the context of various embodiments, the term "node" may refer to an optical terminal device 300 (FIG. 3) or the OLT 204 of FIG. 2.; or a remote node 400 (FIG. 4) or the RN 206 of FIG. 2. The integrated network may be the integrated network 200 of FIG. 2.

In various embodiments, each of the first signal and the third signal may include a wired signal; and each of the second signal and the fourth signal may include a wireless signal.

It should be appreciated that both wired and wireless access may be performed simultaneously, i.e., at the same time.

In various embodiments, the method 600 may further include generating a plurality of optical wavelength signals, wherein the plurality of optical wavelength signals includes the first optical wavelength signal and the second optical wavelength signal.

In one example, the method 600 may further include performing modulation on the first optical wavelength signal based on a predetermined ratio frequency ($f_{LO1}$) to generate the first optical sideband and the second optical sideband of the first optical wavelength signal, the first optical sideband and the second optical sideband may be spaced apart from each other by 2 $f_{LO1}$. In one embodiment, the method 600 may further include suppressing a carrier of the first optical wavelength signal.

The terms "ratio frequency", "first optical sideband" amd "second optical sideband" may be as defined above.

In various embodiments, the first signal may include a downstream wired signal, and the second signal may include a downstream wireless signal. Generating the first signal modulated onto the first optical sideband of the first optical wavelength signal and the second signal modulated onto the second sideband of the first optical wavelength signal may include modulating the first signal onto the first optical sideband of the first optical wavelength signal or the second signal onto the second optical sideband of the first optical wavelength signal using baseband modulation.

The term "baseband modulation" may be as defined above.

In various embodiments, receiving a third signal modulated onto the first optical sideband of a second optical wavelength signal and a fourth signal modulated onto a second sideband of the second optical wavelength signal 604 may include detecting the third signal modulated onto the first optical sideband of the second optical wavelength signal and the fourth signal modulated onto the second sideband of the second optical wavelength signal, wherein the third signal includes an upstream wired signal, the fourth signal includes an upstream wireless signal, and the second optical wavelength signal includes at least a part of at least one of the plurality of optical wavelength signals from the light source.

In various embodiments, the method 600 may further include optically communicating the respective modulated signals with a remote node of the integrated network; converting the respective downstream signals from an optical form to an electrical form; converting the respective upstream signals from the electrical form to the optical form; and communicating the electrical signals with a communication device.

The terms "optically", "electrically", "converting", and "communication device" may be as defined above.

Converting the respective downstream signals may include performing a re-modulation of the respective upstream signals. Performing the re-modulation may include receiving a part of the downstream signals.

The term "re-modulation" is as defined above.

In one embodiment, communicating the electrical signals with the communication device may include receiving and transmitting the respective wired signals from and to an optical network unit.

In another embodiment, communicating the electrical signals with the communication device may include receiving and transmitting the respective wireless signals from and to a base station.

Receiving and transmitting the respective wireless signals from and to the base station may further include converting the respective wireless signals to respective wireless radio frequency signals for transmission via an antenna, and converting respective wireless radio frequency signals received by the antenna to the respective wireless signals.

For example, the optical network unit and the base station may refer to the ONU 208 and/or the BS 210 of FIG. 2, respectively.

Various embodiments of the present invention provides that all optical wavelengths are utilized and that signal processing techniques are used to eliminate the limitation caused by downstream extinction ratio and cross-talk. The most cost-effective method in accordance with various embodiments is whereby upstream and downstream data of both wired and wireless are sent in baseband. Simultaneously sending upstream and downstream baseband for both services has not been demonstrated in most conventional systems. Various embodiments of the present invention is shown to be direct, minimalistic, cost-effective, flexible, and more reliable. Further, the integration of ultra-broadband wireless services and the wired WDM-PON services may be achieved in the same fiber infrastructure.

The following non-limiting examples are described with respect to various embodiments of the invention, as follows.

Figure 7:
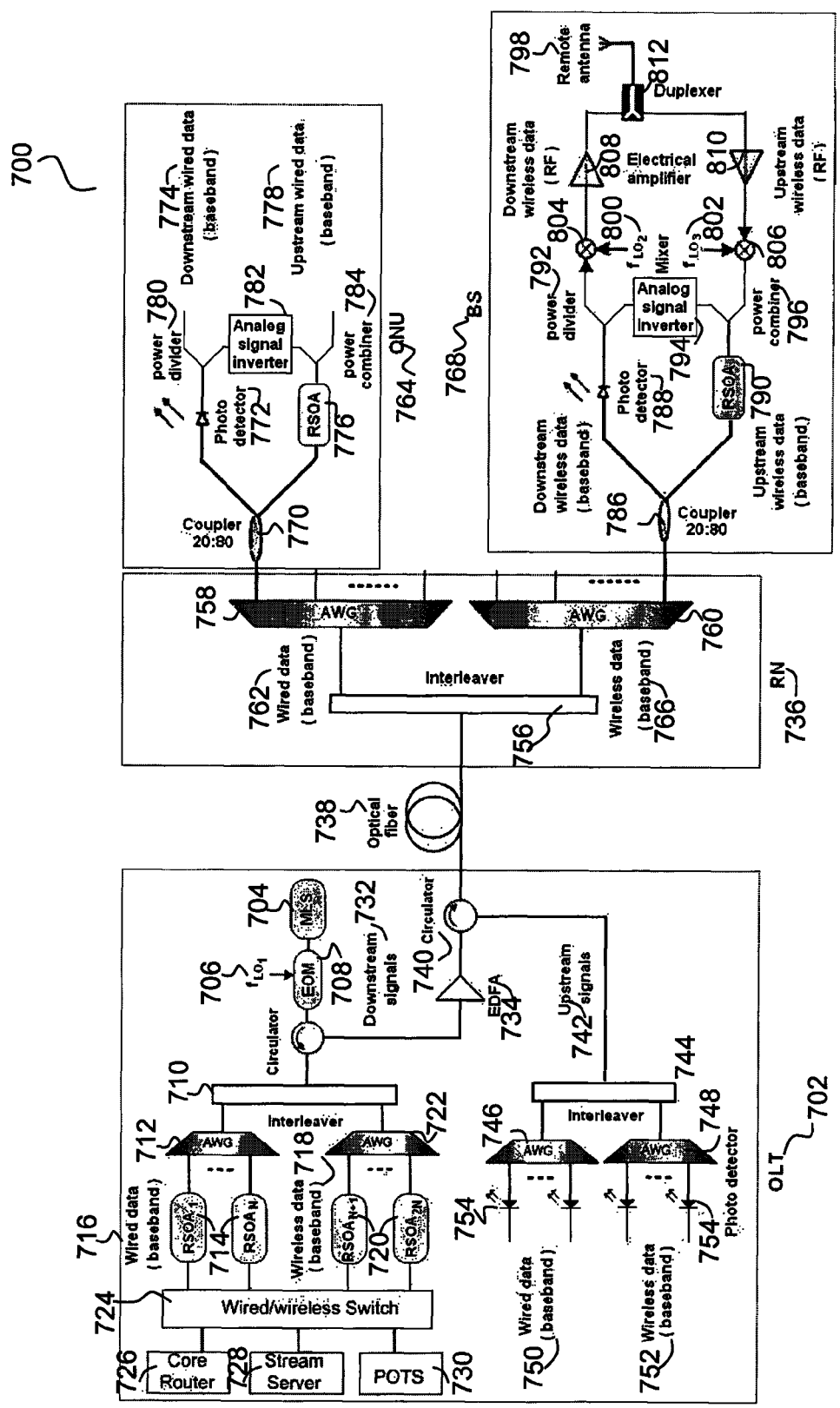
FIG. 7 shows a schematic block diagram of an integrated network illustrating the network components, in accordance to various embodiments.

FIG. 7 shows a block diagram of an integration system 700, in accordance with various embodiment. The integrated system 700 may be the integrated network 200 of FIG. 2.

In FIG. 7, the first block in the integration structure is the OLT 702. For example, the OLT 702 may be the optical terminal device 300 of FIG. 3 or the OLT 204 of FIG. 2. Optical continuous wave (CW) signals from a multi-wavelength light source (MLS) 704 are modulated by a common ratio frequency (RF) $f_{LO1}$ 706. The frequency of $f_{LO1}$ 706 depends on the data rate to be used for the system 700. Generally, the frequency of $f_{LO1}$ 706 is at least twice as high as the data rate. For example, if the maximum data rate per wired/wireless channel is 2.5 Gb/s, the frequency of $f_{LO1}$ 706 may be 5 GHz or higher. The purpose is to generate two optical subcarriers and in the meantime suppress the optical carrier for each wavelength channel. This modulation scheme is also referred to as optical-double-sideband-suppressed-carrier modulation. After passing through an electro-optical modulator (EOM) 708, each wavelength from the MLS 704 provides two optical sidebands (subcarriers) with a spacing of $2f_{LO1}$.

An optical interleaver (IL) 710 or a delay interferometer with a free spectral range of $4f_{LO1}$ is used to separate the upper sideband and the lower sideband of each RF modulated wavelength signal, so that all the upper sidebands emerge at the upper port of the IL 710 and all the lower sidebands appear at the lower port of the IL 710. The upper sidebands are then demultiplexed by an arrayed waveguide grating (AWG) 712. Each upper sideband acting as a seed light is subsequently injected into a RSOA 714 where a downstream wired data 716 is modulated onto that upper sideband through on-off keying (OOK) intensity modulation.

Since the data modulated downstream light is to be reused and remodulated with the upstream data at an associated ONU for the upstream transmission, the extinction ratio of the data modulated downstream light is set at about 3 to 6 dB to ensure acceptably good bit error rate (BER) performance for the upstream transmission. After being modulated with downstream wired data 716, all upper sideband signals are reflected back by respective RSOAs 714 and then multiplexed by the same AWG 712 and fed into the same IL 710. Following the same approach described above, the lower sidebands are used to transmit the downstream wireless data 718 using another set of RSOAs 720 and AWG 722. The same IL 710 may be reused to combine the wired data 716 modulated upper sidebands and the wireless data 718 modulated lower sidebands. The RSOAs 714, 720 are respectively coupled to a wired/wireless switch 724 which is in turn coupled to a core router 726, a stream server 728, and a plain old telephone service (POTS) 730, enabling various wired data 716 and wireless data 718 to be transmitted through the system 700.

Finally, the combined optical signals 732 are amplified by an erbium-doped fiber amplifier (EDFA) 734 and sent to the RN 736 through a feeder fiber 738. For example, the feeder fiber 738 may be the optical channel 202 of FIG. 2.

In receiving, an optical circulator (OC) 740 is used to extract the combined upstream optical signals 742 coming from the RN 736. The combined upstream optical signals 742 are passed through another IL 744 and two AWGs 746, 748 such that all upstream wired signals 750 and upstream wireless signals 752 are separated before being converted into electrical signals by photo detectors 754. The electrical signals of both downstream and upstream for both wired and wireless services 716, 718, 750, 752 are baseband, which may be easily modulated and detected by optical signal modulation and detection. There is also no interference between the wired signals 716, 750 and wireless signals 718, 752 since they are modulated at different optical subcarriers.

In FIG. 7, the next block in the integration structure is the remote node (RN) 736. For example, the RN 736 may be the RN 206 of FIG. 2 or and remote node 400 of FIG. 4. In the integration system 700 based on WDM-PON technologies, the RN 736 is only constructed by passive devices. Once again, an IL 756 is used to separate the data modulated upper and lower sidebands. Two AWGs 758, 760 are used to demultiplex the upper and lower sideband optical signals, respectively. For example, the IL 756 may be the interleaver of the remote node 400 and the AWGs 758, 760 may be the set of arrayed waveguide gratings of the remote node 400 of FIG. 4. After being demultiplexed, each upper sideband signal with wired data 762 is sent to the corresponding ONU 764; each lower sideband signal with wireless data 766 is sent to a base station (BS) 768.

For example, the ONU 764 may be the communication terminal 500 of FIG. 5 or the ONU 208 of FIG. 2. The BS 768 may be the communication terminal 500 of FIG. 5 or the BS 210 of FIG. 2.

The structure of the ONU 764 as shown in FIG. 7 depicts the downstream optical signal from the RN 736 being divided into two unequal portions by an optical coupler with a 20:80 splitting ratio 770. The smaller portion (20%) is fed to a photo detector 772 for detection of downstream wired data 774. The larger portion (80%) is injected into a RSOA 776 for re-modulation of upstream data 778. The detected signal is divded by a power divider 780 into the downstream data 774 and a portion of the detected signal after the photodiode (or photo detector) 772 is fed to an analog signal inverter 782, which may be an analog amplifier whose output signal is inverted with respect to the input signal. The amplitude of the inverted signal may be controlled by adjusting the gain of the inverter 782. The inverted signal is combined with the upstream data by a signal combiner 784. Finally, the combined signal is used to re-modulate the optical signal in the RSOA 776. The downstream data present in the re-modulated signal is erased and its effect on the upstream signal may be significantly reduced. It is verified that the downstream data is significantly suppressed, and the receiver sensitivity for the upstream signal is significantly improved.

For wireless service, the optical signal from the RN 736 is processed in a similar method as for the wired service. The structure of the BS 768 as shown in FIG. 7 depicts the downstream optical signal from the RN 736 being divided into two unequal portions by an optical coupler with a 20:80 splitting ratio 786. The smaller portion (20%) is fed to a photo detector 788 for detection of downstream wirless data. The larger portion (80%) is injected into a RSOA 790 for re-modulation of upstream data. The detected signal is divded by a power divider 792 into the downstream data and a portion of the detected signal after the photodiode (or photo detector) 788 is fed to an analog signal inverter 794. The inverted signal is combined with the upstream data by a signal combiner 796. Finally, the combined signal is used to re-modulate the optical signal in the RSOA 790. However, since the electrical signal needs to be up-converted before being fed to the antenna 798 and down-converted after receiving from the antenna 798, local oscillators (LO) 800, 802 and mixers 804, 806 along with respective amplifiers 808, 810 are needed. Assuming that transmitting and receiving operations are at different frequencies, two local frequency oscillators operating at $f_{LO2}$ and $f_{LO3}$ are needed. A duplexer 812 may also be arranged between the upstream and downstream paths and the remote antenna 798.

For example, the coupler 770, 786 may be the first interface 502 of FIG. 5. For the ONU 764, the signal (power) divider 780 and/or the signal (power) combiner may be the second interface 504, and the photo detector 772 and/or the RSOA 776 may be the converter 506 of FIG. 5. For the BS 768, the signal (power) divider 780 and/or the signal (power) combiner along with their respective LOs 800, 802, mixers 804, 806 and amplifiers 808, 810 coupled to the duplexer 812 and the remote antenna 798 may be referred to as the second interface 504 of FIG. 5. The photo detector 788 and/or the RSOA 790 may be the converter 506 of FIG. 5.

In various embodiments, RSOAs are used in OLT, ONU and BS for modulation and re-modulation of the optical signals. Commercially available RSOAs have a limited modulation bandwidth up to 2 GHz. However, RSOAs may operate at 10 Gb/s and 25 Gb/s with improved optical or electrical signal processing techniques. Therefore, with the improvement in RSOA technologies, various embodiments in accordance to the present invention would easily support higher data rate.

For illustration purposes only and not as a limiting example, the term "substantially" may be quantified as a variance of +/−5% from the exact or actual. For example, the phrase "A is (at least) substantially the same as B" may encompass embodiments where A is exactly the same as B, or where A may be within a variance of +/31 5%, for example of a value, of B, or vice versa.

In the context of various embodiments, the term "about" as applied to a numeric value encompasses the exact value and a variance of +/31 5% of the value.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. An optical terminal device comprising:
   a signal modulator configured to generate a first signal modulated onto a first optical sideband of a first optical wavelength signal and a second signal modulated onto a second sideband of the first optical wavelength signal;

a receiver configured to receive a third signal modulated onto a first optical sideband of a second optical wavelength signal and a fourth signal modulated onto a second sideband of the second optical wavelength signal; and a circulator coupled to the signal modulator and the receiver, wherein the circulator is configured to communicate with a node of an integrated network via an optical fiber, wherein the first signal and the third signal are each a wired signal and the second signal and the fourth signal are each a wireless signal.

2. The optical terminal device of claim 1, further comprising a light source configured to generate a plurality of optical wavelength signals, wherein the plurality of optical wavelength signals comprises the first optical wavelength signal and the second optical wavelength signal.

3. The optical terminal device of claim 2, further comprising an electro-optical modulator arranged between the light source and the signal modulator, wherein the electro-optical modulator is configured to suppress a carrier of the first optical wavelength signal.

4. The optical terminal device of claim 1, further comprising a wired/wireless receiver configured to receive a downstream wired signal as the first signal and a downstream wireless signal as the second signal, wherein the wired/wireless receiver is connected to the signal modulator.

5. The optical terminal device of claim 4, further comprising an optical interleaver coupled to the signal modulator, wherein the interleaver is configured to combine the downstream wired and wireless signals.

6. The optical terminal device of claim 4, wherein the signal modulator is configured to modulate the first signal onto the first optical sideband of the first optical wavelength signal or the second signal onto the second optical sideband of the first optical wavelength signal using baseband modulation.

7. The optical terminal device of claim 1, wherein the signal modulator is a reflective semi-conductor optical amplifier (RSOA).

8. The optical terminal device of claim 1, further comprising a photo detector configured to detect an upstream wired signal as the third signal and an upstream wireless signal as the fourth signal, wherein the photo detector is connected to the receiver.

9. The optical terminal device of claim 8, further comprising a de-interleaver coupled to the receiver, wherein the de-interleaver is configured to separate the upstream signals.

10. The optical terminal device of claim 8, wherein the signal modulator comprises a plurality of signal modulators; and wherein the photo detector comprises a plurality of photo detectors.

11. The optical terminal device of claim 10, further comprising a first pair of arrayed waveguide gratings (AWGs) coupled to the plurality of signal modulators, the first pair of AWGs configured to multiplex the modulated downstream wired signals and the modulated downstream wireless signals; and a second pair of AWGs coupled to the plurality of photo detectors, the second pair of AWGs configured to de-multiplex the upstream wired signals and the upstream wireless signals.

12. A remote node comprising:
a relay unit configured to relay, between an optical terminal device and a first communication terminal of an integrated network, a first signal modulated onto a first optical sideband of a first optical wavelength signal and a second signal modulated onto a first optical sideband of a second optical wavelength signal; and relay, between the optical terminal device and a second communication terminal of the integrated network, a third signal modulated onto a second optical sideband of the first optical wavelength signal and a fourth signal modulated onto a second sideband of the second optical wavelength signal, wherein the first signal and the third signal are each a wired signal and the second signal and the fourth signal are each a wireless signal.

13. The remote node of claim 12, further comprising:
a first transceiver configured to receive and transmit a downstream wired signal as the first signal and an upstream wired signal as the second signal; and
a second transceiver configured to receive and transmit a downstream wireless signal as the third signal and an upstream wireless signal as the fourth signal,
wherein the first transceiver and the second transceiver are optically coupled to the relay unit.

14. The remote node of claim 12, further comprising:
an interleaver configured to communicate with the optical terminal device of the integrated network via an optical fiber; and
a set of arrayed waveguide gratings (AWGs) arranged between the interleaver of the remote node and a plurality of communication terminals of the integrated network, the plurality of communication terminals comprising the first communication terminal and the second communication terminal.

15. The remote node of claim 14, wherein for the plurality of communication terminals, the interleaver is configured to combine the upstream wired signals and the upstream wireless signals, or to separate the downstream wired signals and the downstream wireless signals.

16. A communication terminal comprising:
a first interface configured to optically communicate with a remote node of an integrated network;
a second interface configured to electrically communicate with a communication device; and
a converter arranged between the first and the second interfaces, the converter configured to convert a first signal from an optical form to an electrical form and convert a second signal from the electrical form to the optical form,
wherein the first signal being converted from the optical form to the electrical form is received from the first interface and is modulated onto a first optical sideband of a first optical wavelength signal; and
wherein the second signal being converted from the electrical form to the optical form is output to the first interface and is modulated onto a first optical sideband of a second optical wavelength signal.

17. The communication terminal of claim 16, further comprising a coupler transceiver configured to receive a downstream signal as the first signal, and to transmit an upstream signal as the second signal.

18. The communication terminal of claim 17, wherein the converter comprises a reflective semi-conductor optical amplifier (RSOA) configured to perform a re-modulation of the upstream signal.

19. The communication terminal of claim 18, wherein the RSOA is further configured to receive a part of the downstream signal to perform the re-modulation.

\* \* \* \* \*